(12) United States Patent
Saha et al.

(10) Patent No.: US 7,983,342 B2
(45) Date of Patent: Jul. 19, 2011

(54) MACRO-BLOCK LEVEL PARALLEL VIDEO DECODER

(75) Inventors: Kaushik Saha, New Delhi (IN); Abhik Sarkar, Delhi (IN); Srijib Narayan Maiti, West Bengal (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 1660 days.

(21) Appl. No.: 11/191,613

(22) Filed: Jul. 28, 2005

(65) Prior Publication Data

US 2006/0072674 A1    Apr. 6, 2006

(30) Foreign Application Priority Data

Jul. 29, 2004  (IN) .......................... 1413/DEL/2004

(51) Int. Cl.
- H04N 7/12 (2006.01)
- H04N 11/02 (2006.01)
- H04N 11/04 (2006.01)
- H04B 1/66 (2006.01)

(52) U.S. Cl. ................................................. 375/240.23
(58) Field of Classification Search .................. None
See application file for complete search history.

(56) References Cited

U.S. PATENT DOCUMENTS

| | | | |
|---|---|---|---|
| 5,510,842 A | | 4/1996 | Phillips et al. |
| 5,818,967 A | * | 10/1998 | Bhattacharjee et al. ...... 382/233 |
| 6,678,331 B1 | * | 1/2004 | Moutin et al. ........... 375/240.25 |
| 6,823,016 B1 | * | 11/2004 | Nguyen et al. ........... 375/240.25 |
| 6,842,124 B2 | * | 1/2005 | Penna ............................. 341/67 |
| 6,963,613 B2 | * | 11/2005 | MacInnis et al. ........ 375/240.25 |
| 7,660,352 B2 | * | 2/2010 | Yamane et al. .......... 375/240.12 |
| 2002/0031184 A1 | | 3/2002 | Iwata |
| 2006/0179436 A1 | * | 8/2006 | Yasue .......................... 718/100 |

FOREIGN PATENT DOCUMENTS

| | | |
|---|---|---|
| EP | 0 614 317 A | 9/1994 |
| EP | 0 651 579 A | 5/1995 |
| EP | 0 710 026 A | 5/1996 |
| EP | 1 542 474 A | 6/2005 |
| WO | WO 99/11071 A | 3/1999 |

OTHER PUBLICATIONS

Search Report dated Aug. 1, 2008 for European Application No. EP 05 01 6383.

* cited by examiner

Primary Examiner — Nhon T Diep
(74) Attorney, Agent, or Firm — Lisa K. Jorgenson; Fleit Gibbons Gutman Bongini & Bianco PL (57) ABSTRACT

A macro-block level parallel video decoder for a parallel processing environment is provided. The video decoder includes a Variable Length Decoding (VLD) block for decoding the encoded Discrete Cosine Transform (DCT) coefficients, a master node that receives the decoded DCT coefficients, and multiple slave nodes/processors for parallel implementation of Inverse Discrete Cosine Transform (IDCT) and motion compensation at the macro-block level. Also provided is a method for macro-block level video decoding in a parallel processing system.

22 Claims, 6 Drawing Sheets

MACRO-BLOCK LEVEL PARALLEL VIDEO DECODER

CROSS-REFERENCE TO RELATED APPLICATIONS

This application is based upon and claims priority from prior Indian Patent Application No. 1413/Del/2004, filed Jul. 29, 2004, the entire disclosure of which is herein incorporated by reference.

FIELD OF THE INVENTION

The present invention relates to video decoders, and more particularly to a macro-block level parallel implementation of a video decoder.

BACKGROUND OF THE INVENTION

The MPEG-2 video standard is an important standard for video compression today. The MPEG-2 coding/decoding algorithm can be found in different applications such as digital video broadcast receivers, DVD players, cable TV, graphics/image processing cards, set top boxes, digital cameras, SDTV and HDTV. Due to different profiles and levels of the MPEG-2 video standard, every application has a specific ratio between performance and quality.

The growing demand for high quality video has led to the advancement of the technology of the MPEG encoding/decoding process. The ISO/IEC 13818-2: 1995 MPEG video standard, ITU-T H.262 Recommendation defines a process in which partitioning the bitstream is performed in the encoding or decoding process. The bitstream is partitioned between the channels such that more critical parts of the bitstream (such as headers, motion vectors, low frequency DCT coefficients) are transmitted in the channel with the better error performance, and less critical data (such as higher frequency DCT coefficients) is transmitted in the channel with poor error performance.

The technological improvements come at the cost of increased complexity for real time applications. The real challenge is to cope with the cost and time-to-market. A complete hardware implementation is best to meet the real-time requirement but worst for time-to-market and development cost as described in the paper "Development of a VLSI Chip for Real-Time MPEG-2 Video Decoder", Proceedings of the 1995 International Conference on Image Processing, IEEE, 1995, by Eishi Morimatsu, Kiyoshi Sakai, and Koichi Yamashita.

The reverse is true for a complete implementation in software as detailed in "Software MPEG-2 Video Decoder on a 200-MHz, Low Power Multimedia Microprocessor", IEEE, 1998, pp. 3141-3144. This paper presents a low power, 32-bit RISC microprocessor with a 64-bit "single instruction multiple data" multimedia coprocessor, V830R/AV and its MPEG-2 video decoding performance. This coprocessor basically performs four 16-bit multimedia oriented operations every clock, such as multiply-accumulate with symmetric rounding and saturation, and accelerates computationally intensive procedures of the video decoding; an 8×8 IDCT is performed in 201 clocks. The processor employs the concurrent Rambus DRAM interface, and has facilities for controlling cache behavior explicitly by software to speed up the memory accesses necessary for motion compensation.

The best trade-offs have been obtained with the hardware-software co-design approach as described in "HW/SW codesign of the MPEG-2 Video Decoder", Proc. International Parallel and Distributed Processing Symposium (IPDPS'03). In this paper the VLD decoding algorithm and IDCT algorithm are implemented with fast parallel architectures directly in hardware. The hardware part is described in VHDL/Verilog and implemented together with the RISC processor in a single Virtex 1600E FPGA device. The algorithms are run in software on a 32-bit RISC processor for decoding of the coded bitstream, inverse quantization and motion-compensation implemented in FPGA, and Linux is used as the operating system. This partitioning is therefore done at the frame level to achieve better timing properties and lower power consumption.

The software-based implementation has the advantage of easy adaptability of future enhancements. In all cases, higher processing throughput is currently the need. The solution is either to have a very high-speed special purpose processor or a set of processors with lower speed, working in parallel. A paper by Mikael Karlsson Rudberg and Lars Wanhammar, "An MPEG-2 Video Decoder DSP Architecture", Proc. 1996 IEEE Digital Signal Processing Workshop, pp. 199-202, elaborates one such architecture.

The faster processors are expensive both in terms of cost and power consumption, whereas the recent developments in the System on Chip (SOC) front give us the freedom to have multiple simple processors in a single system, making parallel implementation a more economical solution.

Applications involving computations on large amounts of data (e.g., multimedia codecs) lead to excessive loading of the CPU. Through parallel computation the loading of each machine is reduced as the computational effort is distributed among the machines. This enhances the speed of computation by a factor that is a function of the number of processors used.

There are primarily two paradigms of parallel computation: a shared memory system and a distributed memory system. Details of a distributed memory system can be obtained from "Fundamentals of Distributed Memory Computing", Cornell Theory Center: Virtual Workshop Module.

The shared memory approach requires a multi-port memory to be used as the means of communication between the computing nodes for simultaneous access to operands. This approach makes parallel application development easier. However, implementation of multi-port memories is expensive in the present state of memory technology. On the other hand, the distributed memory approach avoids this complexity in hardware and thereby reduces the silicon cost significantly. However, the task of application development is made more difficult.

U.S. Pat. No. 6,678,331 discloses a circuit that includes a microprocessor, an MPEG decoder for decoding an image sequence, and a memory common to the microprocessor and the decoder. The circuit also includes a circuit for evaluating a decoder delay, a control circuit for, if the decoder delay is greater than a predetermined level, granting the decoder a memory access priority, and otherwise, granting the microprocessor the memory access priority.

SUMMARY OF THE INVENTION

It is an object of the present invention to overcome the above limitations and to provide a macro-block level parallel implementation of an MPEG-2 video decoder for a parallel processing environment with a shared memory or a distributed memory system.

Another object of the present invention is to provide MPEG-2 video decoding for a parallel processing environment, with parallelization being at the macro-block level.

Still another object of the present invention is to provide a high speed MPEG-2 video decoder.

Yet another object of the present invention is to provide better load balancing of the processors of an MPEG-2 video decoder.

Another object of the present invention is to have less data dependency among the processors of an MPEG-2 video decoder.

Yet another object of the present invention is to provide a simple I/O architecture, and reduce shared memory access for a shared memory architecture, and reduce traffic on the underlying interconnection network for a distributed memory architecture.

A further object of the present invention is to provide a high computation to communication ratio for a distributed memory architecture.

One embodiment of the present invention provides a macro-block level parallel video decoder for a parallel processing environment is provided. The video decoder includes a Variable Length Decoding (VLD) block for decoding the encoded Discrete Cosine Transform (DCT) coefficients, a master node that receives the decoded DCT coefficients, and multiple slave nodes/processors for parallel implementation of Inverse Discrete Cosine Transform (IDCT) and motion compensation at the macro-block level.

Another embodiment of the present invention provides a method for macro-block level video decoding in a parallel processing system. According to the method, encoded discrete cosine transform coefficients are decoded in a variable length decoding block, decoded discrete cosine transform coefficients are received at a master node, and parallelized inverse discrete cosine transform and motion compensation are performed using the master node and a plurality of slave nodes.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Preferred embodiments of the present invention provide a macro-block level parallel implementation of a video decoder for a parallel processing environment. The video decoder includes a Variable Length Decoding (VLD) block for decoding the encoded Discrete Cosine Transform (DCT) coefficient, a master node which receives the decoded DCT coefficients, and multiple slave nodes/processors for parallel implementation of Inverse Discrete Cosine Transform (IDCT) and motion compensation at the macro-block level.

In one embodiment for distributed memory systems, the master node communicates decoded data to the multiple slave nodes. In another embodiment for shared memory systems, the master node segregates data to be processed by the multiple slave nodes.

Preferably, the slave nodes/processors process equal portions of picture and compute the output to be written on a single memory buffer.

In some embodiments, the master node and the slave nodes/processors comprise computation and communication threads for distributed memory architectures. Preferably, the communication threads help in communication of the master node and the slave nodes/processors amongst each other.

Further embodiments of the present invention provide a method for macro-block level video decoding in a parallel processing system. According to one embodiment, the encoded DCT coefficient is decoded in a VLD block, the decoded DCT coefficients are segregated in a master node, and parallelized IDCT and motion compensation are performed using multiple slave nodes/processors.

Preferably, the non-zero DCT coefficients are packed into the buffer, reducing data dependency on the slave nodes/processors.

Exemplary embodiments of the present invention will now be described in detail with reference to FIGS. 1 to 6.

The following description starts with an overview of the MPEG-2 decoding system followed by implementation details, simulation environments and results. The description is for a 4-processor implementation, but is applicable for 2-processor systems also. Further, the processing speed constraint for multimedia applications is becoming more demanding. The MPEG-2 video decoder lays the foundation for more complex video decoders. Hence, the following processing systems and techniques can be treated as steps toward parallel implementation of more advanced complex video decoding technologies.

Figure 1:
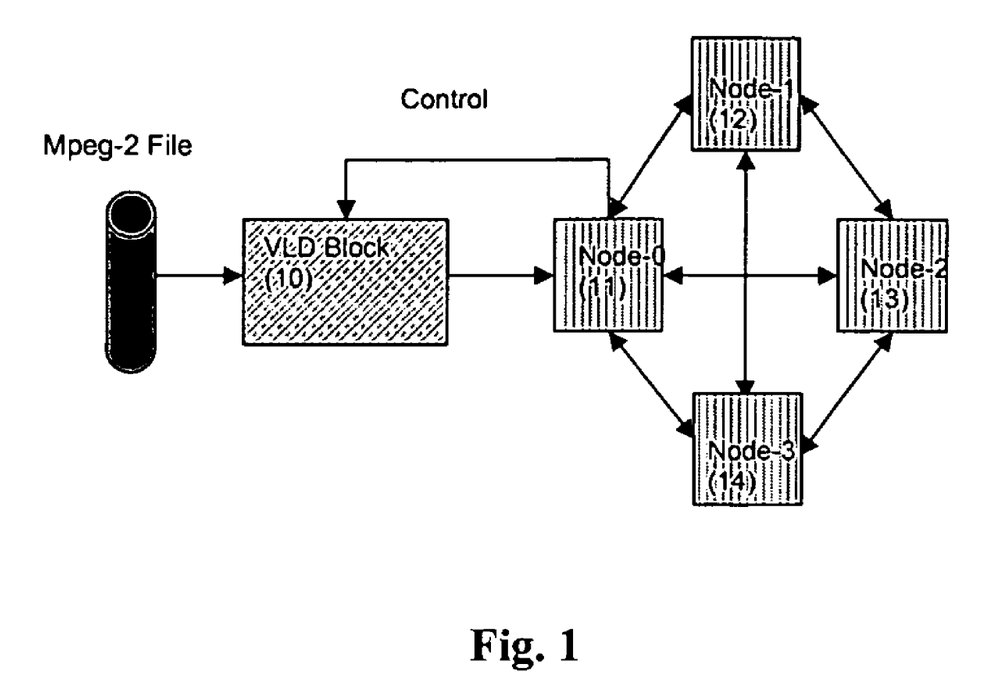
FIG. 1 shows a system overview of an embodiment of the present invention for a distributed memory system.

One embodiment deals with parallel implementation of IDCT and motion compensation of the MPEG-2 video decoder using a four node Beowulf Cluster simulating a distributed memory architecture. In this embodiment, the system for MPEG-2 video decoding, as shown in FIG. 1, includes a VLD block 10 connected to a processing node that is the master node 11 of the cluster of processing units for control purposes. The nodes are interconnected to each other through an underlying network. The VLD is a standard process in MPEG-2, which decodes the encoded DCT coefficients and the motion vectors. This decoded data is communicated by the master node 11 to the rest of the processors that are slave nodes 12, 13 and 14. Thereafter the IDCT and motion compensation is carried out in parallel by all of the nodes.

The VLD block 10 separates macro block data for each processor and the master node 11 distributes them to the rest of the processors subsequently. Thereafter each processor performs the IDCT for its quadrant of macro blocks. The data for motion compensation is communicated to/from the other processors. The merit of this approach is that, in each processor, only the macro block at the quadrant boundary requires data from other processors for motion compensation. So, the data dependency is less.

Figure 4:
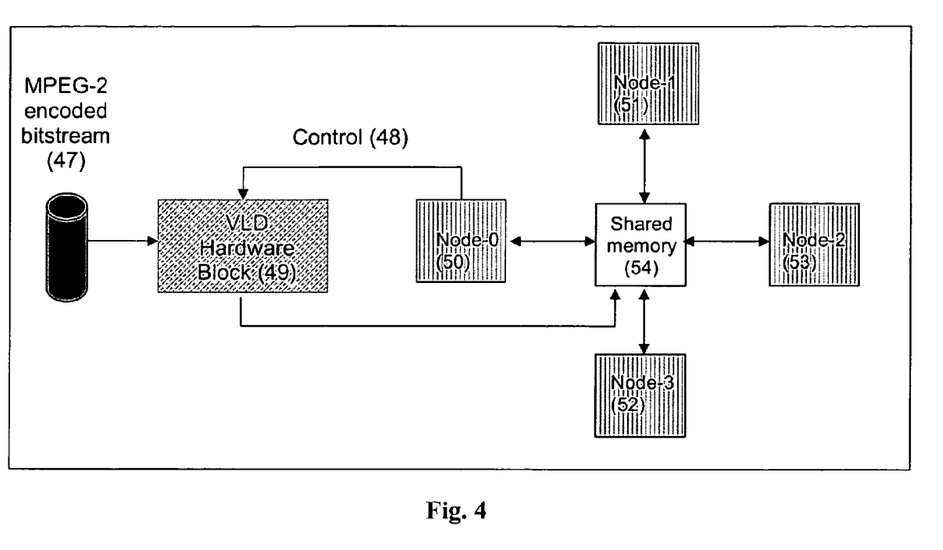
FIG. 4 shows a system overview of an embodiment of the present invention for a shared memory system.

In an embodiment for a shared memory architecture, all of the nodes 50 to 53 process separate portions of the data block.

The nodes 50 to 53 need not communicate data to the other processors; rather they share a common memory space 54 for data needed by all of the processors 50 to 53, as illustrated in FIG. 4.

The sample decoder implementation from the MPEG Software Simulation Group has been parallelized. The parallelization is at the macro-block level.

Figure 2:
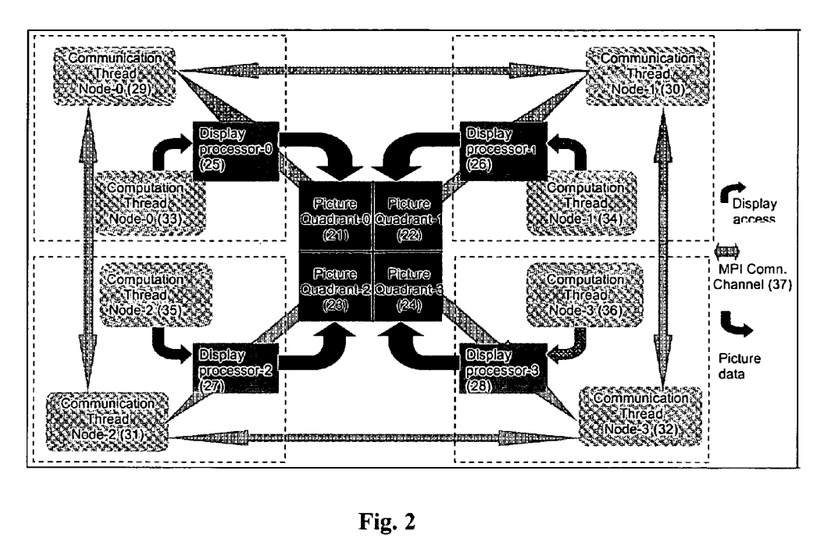
FIG. 2 shows an architectural view of an embodiment of the present invention for a distributed memory system.

FIG. 2 shows an architectural view of an embodiment of the present invention for a distributed memory architecture having four processors. As shown in the figure, the picture frame has been separated into 4 quadrants, namely 21, 22, 23 and 24. The output to be displayed on each of the four quadrants is separately computed and written by the corresponding node on a single video memory buffer.

Each of the processors has two separate threads: the computation thread and the communication thread. The communication threads 29, 30, 31 and 32 communicate with every other communication thread in other processors through the underlying message passing system (MPI) 37, whereas the computation threads 33, 34, 35 and 36 go on performing IDCT and motion compensation for the macro blocks of their quadrants for which there are no data requirements from the other processors.

Figure 3:
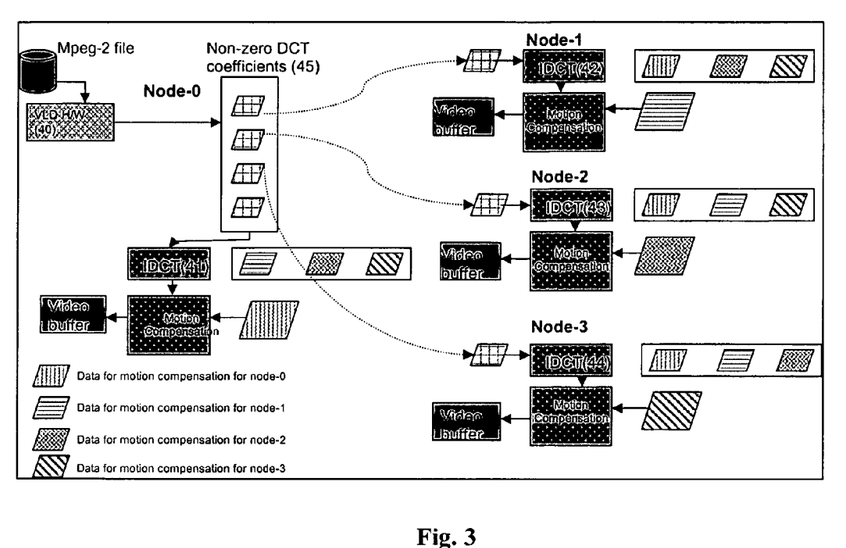
FIG. 3 shows an algorithmic view of an embodiment of the present invention for a distributed memory system.

FIG. 3 shows an algorithmic view of an embodiment of the present invention for a distributed memory system. As shown, the MPEG-2 video decoding is divided into two main functional blocks: the VLD block 40 and the IDCT 41-44. The VLD block 40 generates the DCT coefficients. Only the non-zero DCT coefficients 45 for each DCT-block are packed into a video buffer. Due to the inherent nature of the DC and AC coefficients in an MPEG file, this approach leads to less data to be communicated to the processors. The DC coefficients are packed in as they are since they constitute the average energy value of each DCT-block, which makes it the largest value in the DCT-block. The DC coefficients are preceded by a count of the number of non-zero DCT coefficients (for a DCT-block) to be followed.

An AC coefficient requires approximately 10 bits of storage, thus another 6 bits store the positional coordinates x and y (3 bits each since MPEG-2 DCT-blocks are 8-by-8 in dimension) of the non-zero coefficient within the DCT-block. This approach is more efficient in distributed memory systems for bit-streams with lower bit rates as the number of non-zero coefficients will be less.

Once all of the DCT coefficients have been recovered from the compressed data, the other three nodes receive their corresponding coefficients from node-0. The IDCT in all of the nodes is performed in parallel while the communication threads exchange data required for the motion compensation with each other. After IDCT has been performed and the data for motion compensation has been received, motion compensation is carried out in parallel by all of the nodes and displayed subsequently.

Figure 5:
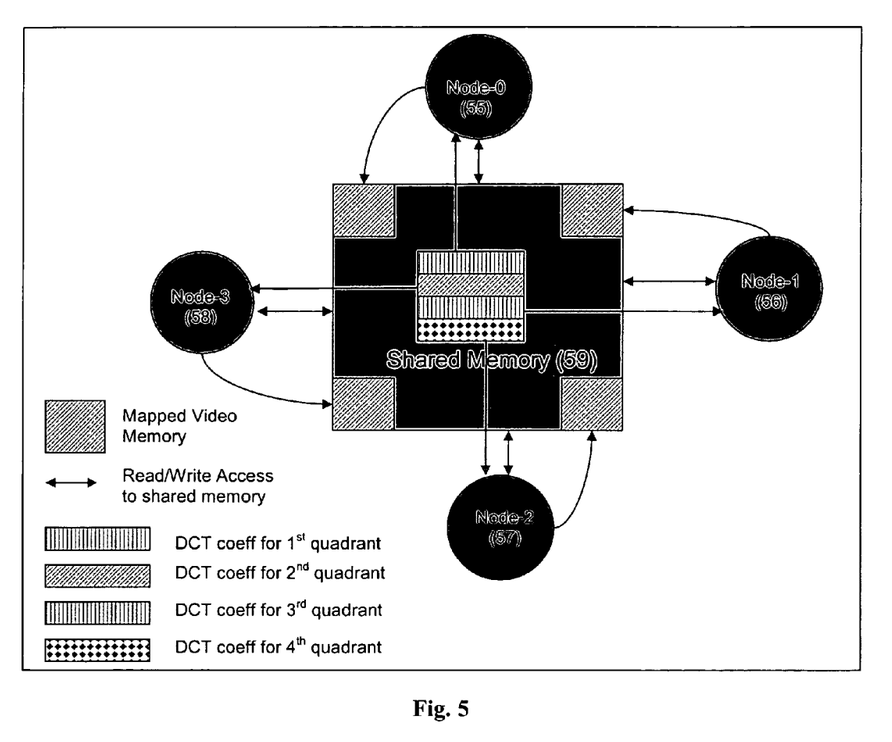
FIG. 5 shows an architectural view of an embodiment of the present invention for a shared memory system.

FIG. 5 shows an architectural view of an embodiment of the present invention for a shared memory system. In a shared memory approach, the VLD block segregates DCT coefficients and puts them in a shared memory 59, and all processors 55 to 58 can access data assigned to them. The IDCT and motion compensation are performed in parallel. The data for motion compensation is fetched from shared memory 59, where the previously decoded frames are stored.

Figure 6:
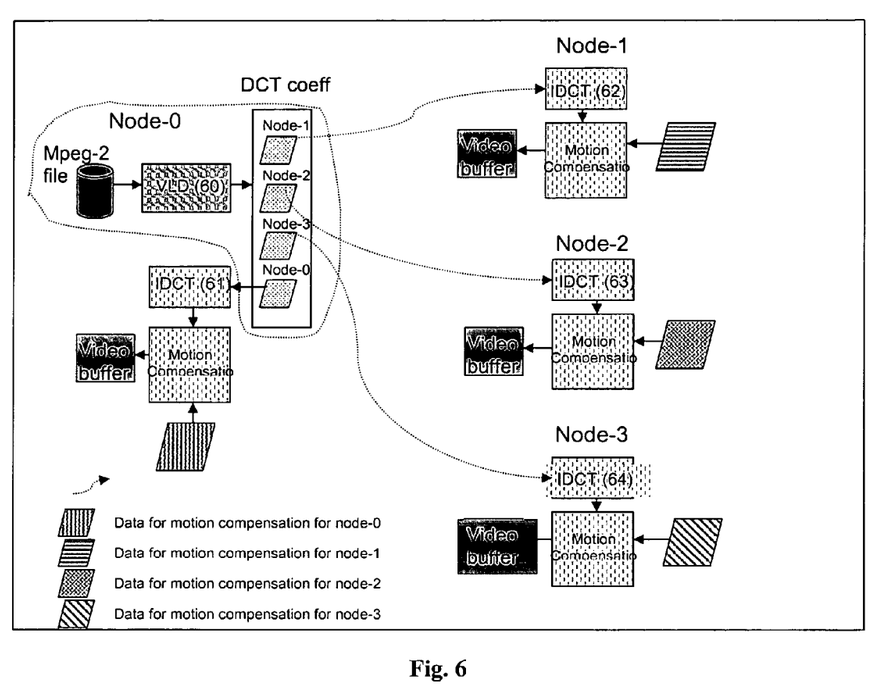
FIG. 6 shows an algorithmic view of an embodiment of the present invention for a shared memory system.

FIG. 6 presents an algorithmic view of an embodiment of the decoder for a shared memory system. In this case, the DCT coefficients of all of the macro-blocks are stored in the memory. Thereafter, every processor performs IDCT 61 to 64 on its allotted set of coefficients. The motion compensation data is accessed from the previously decoded frames buffered in shared memory. The decoded pixel values are then placed into mapped video memory.

The following simulation environment was used.

Hardware Used

Linux cluster having 4 Intel Pentium-II processors running at 400 MHz networked in Star Topology on 10base-T UTP Ethernet Software Used a. Linux kernel 2.4.7-10 b. Lam-MPI-6.5.6—Parallel programming library, based on MPI message passing API c. PAPI Profiling Tool—makes processor's hardware counters available to profiler application libraries like TAU d. TAU-2.12.9.1—Profiler Library uses the hardware counters to generate traces e. VAMPIR-4.0.0.0—Graphical Display for profiled traces generated by TAU From this environment, the following behavior of the decoder in terms of speed-up, data dependency, computation to communication ratio and load balancing was obtained. Speed-up is for the parallelizable portion of the decoding process (i.e., IDCT and Motion-Compensation). The data dependency is calculated in terms of the ratio of the number of bytes processed by one processor to the number of bytes to be communicated from other processors for motion compensation.

Speed-Up

Sequential execution Time $(T_{SEQ})=T_{IDCT}$, where $T_{IDCT}$=Execution Time for IDCT+Motion Compensation in one processor Parallel execution Time $(T_P)=T_{IDCT-Parallel}$, where, $T_{IDCT-Parallel}$=average execution time for IDCT and Motion Compensation in single processor (4 processors executing IDCT and Motion Compensation in parallel).

Ideally should be $T_{IDCT}/N$, where N is the number of processors.

Speed Up=$T_{IDCT}/T_{IDCT-Parallel}$=3.87, for N=4.

Data Dependency (For Distributed Memory Architecture)

Data Dependency (for each processor)=Amount of data (bytes) communicated from other processors/Number of data (bytes) processed by one processor=12.38%

The Data Dependency for motion compensation decreases with the increase in size of the picture since only the macro-blocks at the edges of the quadrants require data to be communicated. The ratio between the macro-blocks at the edges of a picture to the total macro-blocks in a quadrant decreases with the increase in the size of the picture.

Computation to Communication Ratio (For Distributed Memory Architecture)

Computation to communication ratio is calculated as the ratio of computation cycles on communicated data and data communication between well-defined synchronization events.

About 254 cycles/byte Computation to communication ratio has been obtained with the synchronization point being completion of one frame decoding.

Load Balancing

For distributed memory architectures, the thread-based communication helps the processors to perform the computation in parallel with the communication of data for motion compensation. This way all of the processors are kept busy all of the time.

Since the number of DCT blocks in each quadrant is the same, the IDCT load on each node is balanced with respect to the others. Since the motion compensation data dependency between nodes is small, as described above, every node, on an average, does the same number of computations for motion compensation as the others.

For a distributed memory architecture, the communication bandwidth requirement for the network of the Beowulf cluster is about 2.88 Mbps for a typical video sequence. This communication is comprised of DCT coefficients (92.5%) and motion compensation data (7.5%).

Embodiments of the present invention highlight one approach of parallelizing the MPEG-2 video decoding process in a parallel processing environment along with simulation results. The inherent inter-processor data dependency in the MPEG-2 video is due to the motion estimation/compensation. Using the present invention, this dependency is reduced. This approach also improves load balancing between processors, due to the application partitioning. This manner of partitioning also leads to a simpler I/O architecture (e.g., as shown in FIG. 2) and minimizes or reduces traffic on the underlying interconnection network for distributed memory systems. For shared memory systems, this reduces the shared memory access. The speed-up is also close to the number of processors.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A macro-block level parallel video decoder for a parallel processing environment, the video decoder comprising:
   a single variable length decoding block for decoding all encoded discrete cosine transform coefficients for a frame; and
   a plurality of processing nodes comprising:
      a single master processing node coupled to the single variable length decoding block, the master processing node receiving decoded discrete cosine transform coefficients; and
      a plurality of slave processing nodes coupled to the master processing node,
   wherein each of the processing nodes includes at least one processor, and
   the master processing node and the slave processing nodes perform parallelized inverse discrete cosine transform and motion compensation for the frame at a macro-block level.

2. The video decoder as claimed in claim 1,
   wherein each of the processing nodes further includes a memory so as to form a distributed memory system,
   the master processing node receives all of the decoded discrete cosine transform coefficients from the single variable length decoding block, and
   the master processing node communicates some of the decoded discrete cosine transform coefficients to each of the slave processing nodes in the distributed memory system.

3. The video decoder as claimed in claim 2, wherein after the master processing node communicates the decoded discrete cosine transform coefficients to the slave processing nodes, each of the processing nodes performs the inverse discrete cosine transform for its macro blocks and data for the motion compensation is communicated between the processing nodes.

4. The video decoder as claimed in claim 1, further comprising a shared memory that is accessible by all of the processing nodes so as to form a shared memory system, the master processing node segregating data to be processed by the slave processing nodes in the shared memory system.

5. The video decoder as claimed in claim 1, wherein each of the processing nodes processes an equal portion of the frame.

6. The video decoder as claimed in claim 5, further comprising a single video memory buffer, all of the processing nodes write their output to the single video memory buffer.

7. The video decoder as claimed in claim 1, wherein each of the processing nodes comprises:
   at least one computation thread performing the parallelized inverse discrete cosine transform and motion compensation of the processing node; and
   at least one communication thread communicating with the communication threads of other processing nodes through an underlying message passing system for a distributed memory system.

8. The video decoder as claimed in claim 7,
   wherein the inverse discrete cosine transform is performed in parallel by the computation threads of all of the processing nodes while the communication threads exchange data required for the motion compensation, and
   after the inverse discrete cosine transform has been performed and the data required for the motion compensation has been received, the motion compensation is performed in parallel by all of the processing nodes.

9. The video decoder as claimed in claim 1, wherein the single variable length decoding block is implemented in hardware.

10. An information processing system including at least one macro-block level parallel video decoder for a parallel processing environment, and at least one memory buffer coupled to the video decoder, the video decoder comprising:
   a single variable length decoding block for decoding encoded discrete cosine transform coefficients for a frame; and
   a plurality of processing nodes comprising:
      a single master processing node coupled to the single variable length decoding block, the master processing node receiving decoded discrete cosine transform coefficients; and
      a plurality of slave processing nodes coupled to the master processing node,
   wherein each of the processing nodes includes at least one processor, and
   the master processing node and the slave processing nodes perform parallelized inverse discrete cosine transform and motion compensation for the frame at a macro-block level.

11. The information processing system as claimed in claim 10,
   wherein each of the processing nodes of the video decoder further includes a memory so as to form a distributed memory system,
   the master processing node receives all of the decoded discrete cosine transform coefficients from the single variable length decoding block, and the master processing node communicates some of the decoded discrete cosine transform coefficients to each of the slave processing nodes in the distributed memory system.

12. The information processing system as claimed in claim 10, further comprising a shared memory that is accessible by all of the processing nodes so as to form a shared memory system, the master processing node of the video decoder segregating data to be processed by the slave processing nodes in the shared memory system.

13. The information processing system as claimed in claim 10,
wherein the at least one memory buffer is a single video memory buffer,
each of the processing nodes of the video decoder processes an equal portion of the frame, and
all of the processing nodes of the video decoder write their output to the single video memory buffer.

14. The information processing system as claimed in claim 10, wherein each of the processing nodes of the video decoder comprises:
at least one computation thread performing the parallelized inverse discrete cosine transform and motion compensation of the processing node; and
at least one communication thread communicating with the communication threads of other processing nodes through an underlying message passing system for a distributed memory system.

15. The information processing system as claimed in claim 14,
wherein the inverse discrete cosine transform is performed in parallel by the computation threads of all of the processing nodes while the communication threads exchange data required for the motion compensation, and
after the inverse discrete cosine transform has been performed and the data required for the motion compensation has been received, the motion compensation is performed in parallel by all of the processing nodes.

16. The information processing system as claimed in claim 10, wherein the information processing system comprises a DVD player.

17. The information processing system as claimed in claim 10, wherein the information processing system comprises a digital video receiver or a set top box for at least one of cable TV, SDTV, and HDTV.

18. A method for macro-block level parallel video decoding in a parallel processing system, the system including a plurality of processing nodes comprising a single master processing node and a plurality of slave processing nodes coupled to the master processing node, the method comprising the steps of:
decoding all encoded discrete cosine transform coefficients for a frame in a single variable length decoding block;
receiving decoded discrete cosine transform coefficients at the master processing node; and
performing, by the master processing node and a plurality of slave processing nodes, parallelized inverse discrete cosine transform and motion compensation for the frame at a macro-block level,
wherein each of the processing nodes includes at least one processor.

19. The method as claimed in claim 18, further comprising a step of segregating, by the master processing node, the decoded discrete cosine transform coefficients.

20. The method as claimed in claim 18, wherein the receiving step comprises:
receiving, at the master processing node, all of the decoded discrete cosine transform coefficients from the single variable length decoding block; and
communicating some of the decoded discrete cosine transform coefficients from the master processing node to each of the slave processing nodes in a distributed memory system.

21. The method as claimed in claim 18, wherein in the performing step, each of the processing nodes processes an equal portion of the frame.

22. The method as claimed in claim 18, further comprising a step of packing non-zero discrete cosine transform coefficients into a buffer so as to reduce data dependency on the processing nodes.

* * * * *